United States Patent
Tamura

(10) Patent No.: US 10,936,094 B2
(45) Date of Patent: Mar. 2, 2021

(54) WRITING INPUT DEVICE AND WRITING INPUT SYSTEM

(71) Applicant: SHARP KABUSHIKI KAISHA, Sakai (JP)

(72) Inventor: Naoki Tamura, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/700,537

(22) Filed: Dec. 2, 2019

(65) Prior Publication Data

US 2020/0183507 A1 Jun. 11, 2020

(30) Foreign Application Priority Data

Dec. 7, 2018 (JP) .............................. JP2018-229851

(51) Int. Cl.
| | |
|---|---|
| *G06F 3/03* | (2006.01) |
| *G06F 3/0354* | (2013.01) |
| *G06F 3/041* | (2006.01) |
| *G06F 3/16* | (2006.01) |

(52) U.S. Cl.
CPC ...... *G06F 3/03545* (2013.01); *G06F 3/04146* (2019.05); *G06F 3/167* (2013.01)

(58) Field of Classification Search
None
See application file for complete search history.

(56) References Cited

U.S. PATENT DOCUMENTS

| | | | | | |
|---|---|---|---|---|---|
| 2009/0295758 | A1* | 12/2009 | Lee | .................... | G06F 3/03545 345/177 |
| 2012/0127088 | A1* | 5/2012 | Pance | .................. | G06F 3/04812 345/173 |
| 2016/0044422 | A1* | 2/2016 | Aurongzeb | ......... | G06F 3/03545 345/179 |

FOREIGN PATENT DOCUMENTS

JP H08-190450 A 7/1996

* cited by examiner

*Primary Examiner* — Joseph R Haley
(74) *Attorney, Agent, or Firm* — ScienBiziP, P.C.

(57) ABSTRACT

A touch pen includes a microphone that detects contact sound generated when a nib contacts an input surface of a touch panel, a voice generator that generates pseudo voice based on the contact sound detected by the microphone, and a voice outputter that outputs the pseudo voice generated by the voice generator.

18 Claims, 11 Drawing Sheets

221

| WRITING MODE | CONTENTS |
|---|---|
| M1 | BLACKBOARD/CHALK |
| M2 | PAPER/PENCIL |
| M3 | PAPER/<br>BALLPOINT PEN |
| ... | ... |

FIG. 6

| WRITING MODE | DETERMINATION DATA | SAMPLE VOICE DATA | SOUND VOLUME COEFFICIENT |
|---|---|---|---|
| M1 | DF11 | SF1(FIRST TOUCH SOUND) | 1.2 |
| M1 | DF12 | SF1(FIRST TOUCH SOUND) | 0.5 |
| M1 | DR11 | SR1(FRICTION SOUND) | 1.2 |
| M1 | DR12 | SR1(FRICTION SOUND) | 0.5 |
| M2 | DF21 | SF2(FIRST TOUCH SOUND) | 1.1 |
| M2 | DF22 | SF2(FIRST TOUCH SOUND) | 0.6 |
| M2 | DR21 | SR2(FRICTION SOUND) | 1.1 |
| M2 | DR22 | SR2(FRICTION SOUND) | 0.6 |
| M3 | DF31 | SF3(FIRST TOUCH SOUND) | 1.3 |
| M3 | DF32 | SF3(FIRST TOUCH SOUND) | 0.6 |
| M3 | DR31 | SR3(FRICTION SOUND) | 1.3 |
| M3 | DR32 | SR3(FRICTION SOUND) | 0.6 |

FIG. 7
| DETERMINATION DATA | VOICE WAVEFORM |
|---|---|
| DF11<br>(FIRST TOUCH SOUND:<br>LOUD) |  |
| DF12<br>(FIRST TOUCH SOUND:<br>SOFT) |  |
| DR11<br>(FRICTION SOUND:<br>LOUD) |  |
| DR12<br>(FRICTION SOUND:<br>SOFT) |  |

FIG. 8
| SAMPLE VOICE DATA | VOICE WAVEFORM |
|---|---|
| SF1 (FIRST TOUCH SOUND) |  |
| SR1 (FRICTION SOUND) |  |

FIG. 11

| DETERMINATION DATA | WRITING PRESSURE WAVEFORM |
|---|---|
| DF11 (FIRST TOUCH SOUND: LOUD) | ← DIFFERENTIAL VALUE |
| DF12 (FIRST TOUCH SOUND: SOFT) | ← DIFFERENTIAL VALUE |
| DR11 (FRICTION SOUND: LOUD) | |
| DR12 (FRICTION SOUND: SOFT) | |

WRITING INPUT DEVICE AND WRITING INPUT SYSTEM

INCORPORATION BY REFERENCE

This application is based upon and claims the benefit of priority from the corresponding Japanese Patent Application No. 2018-229851 filed on Dec. 7, 2018, the entire contents of which are incorporated herein by reference.

BACKGROUND OF THE INVENTION

Field of the Invention

The present disclosure relates to a writing input device and a writing input system capable of performing writing input on a touch panel.

Description of the Background Art

A system capable of performing writing input on an electronic board (e.g., an electronic blackboard or an electronic whiteboard) such as a touch panel with an electronic pen such as a stylus pen has been known. The method for performing writing with the electronic pen on the touch panel is different from the typical method for performing writing with a chalk on a blackboard in that the materials of the electronic pen and an input surface are different from the materials of the chalk and the blackboard. For this reason, almost no writing sound is generated upon writing. It has been known that at a school, a meeting, etc., writing sound by a writer contributes to improvement of the power of concentration of a participant. Typically, in the above-described system, the technique of generating pseudo voice of the writing sound generated upon writing with the chalk on the blackboard has been proposed. For example, the technique of generating the pseudo voice based on a pen speed has been proposed.

An object of the present disclosure is to provide a writing input device and a writing input system capable of outputting pseudo voice with high reproducibility of writing sound generated by contact of the writing input device such as an electronic pen with a contact target such as an input surface.

SUMMARY OF THE INVENTION

A writing input device according to one aspect of the present disclosure is a writing input device capable of performing writing input on a touch panel. The writing input device includes a microphone that detects contact sound generated when a tip end of the writing input device contacts a contact target, a voice generator that generates pseudo voice based on the contact sound detected by the microphone, and a voice outputter that outputs the pseudo voice generated by the voice generator.

A writing input system according to another aspect of the present disclosure includes a touch panel and a writing input device capable of performing writing input on the touch panel. The writing input system includes a microphone that detects contact sound generated when a tip end of the writing input device contacts a contact target, a voice generator that generates pseudo voice based on the contact sound detected by the microphone, and a voice outputter that outputs the pseudo voice generated by the voice generator.

According to the present disclosure, it is possible to output the pseudo voice with high reproducibility of the writing sound generated by contact of the writing input device such as the electronic pen with the contact target such as the input surface.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 6 is a view illustrating an example of voice data information stored in the storage of the touch pen according to the embodiment of the present disclosure.

FIG. 7 is a view illustrating an example of determination data stored in the storage of the touch pen according to the embodiment of the present disclosure.

FIG. 8 is a view illustrating an example of sample voice data stored in the storage of the touch pen according to the embodiment of the present disclosure.

FIG. 11 is a view illustrating another example of the determination data stored in the storage of the touch pen according to the embodiment of the present disclosure.

DESCRIPTION OF THE PREFERRED EMBODIMENTS

Hereinafter, an embodiment of the present disclosure will be described with reference to the attached drawings. Note that the following embodiment is one example for embodying the present disclosure, and does not have character limiting the technical scope of the present disclosure.

Figure 1:
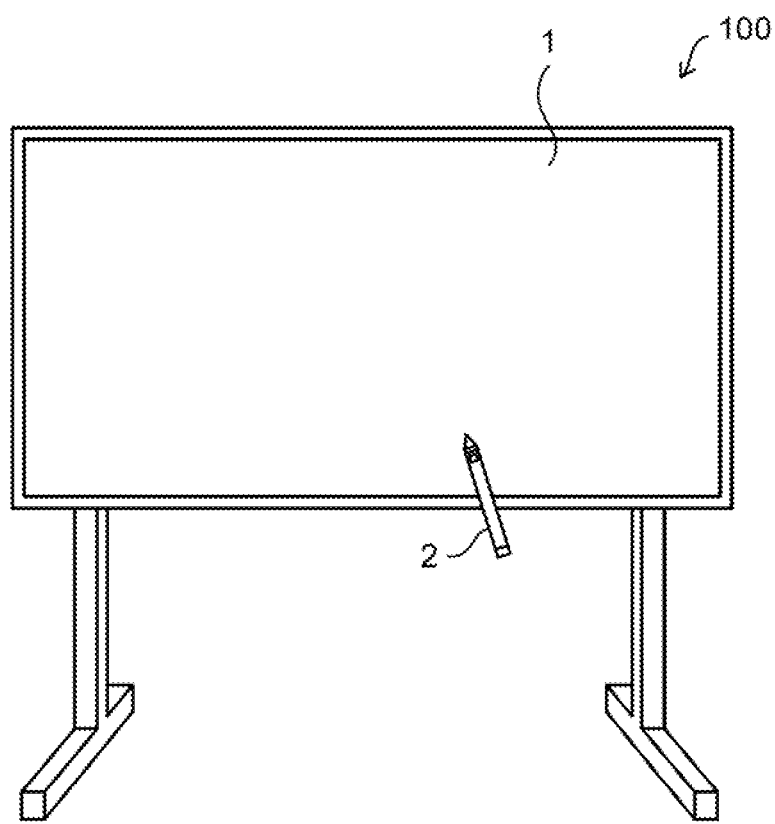
FIG. 1 is an external view illustrating a configuration of a writing input system according to an embodiment of the present disclosure.

As illustrated in FIG. 1, a writing input system 100 according to the embodiment of the present disclosure includes an electronic board 1 and a touch pen 2 capable of inputting a writing such as a handwriting character to the electronic board 1. The electronic board 1 includes a later-described display panel 13 and a later-described touch panel 14. When a nib 20 (see FIG. 3) of the touch pen 2 contacts an input surface (a touch surface) of the touch panel 14, a contact position is detected, and information (e.g., the handwriting character) is drawn on a display surface of the display panel 13 based on such a contact position. The writing input system 100 is one example of a writing input system of the present disclosure, and the touch pen 2 is one example of a writing input device of the present disclosure.

Electronic Board 1

In the present disclosure, an electronic board having a well-known configuration can be applied. An outline configuration of the electronic board 1 will be described herein as one example, and detailed description will be omitted.

The electronic board 1 includes a controller 11, a storage 12, the display panel 13, the touch panel 14, and a communicator 15.

The display panel 13 is a display that displays an image, and is a liquid crystal display, for example.

The touch panel 14 receives user's touch input from the touch pen 2 to the touch panel 14. The touch panel 14 may be a capacitive touch panel or a pressure-sensitive touch panel. That is, the touch panel 14 may be a device capable of receiving the user's touch input such as a touch. The touch panel 14 may be arranged on a front surface of the display panel 13, or may be built in the display panel 13. Alternatively, the touch panel 14 and the display panel 13 may be arranged at separate locations, and may be configured communicable with each other. An integrated touch panel display configured such that the touch panel 14 is arranged on the front surface of the display panel 13 and the touch panel 14 and the display panel 13 are integrally formed will be described herein by way of example.

The communicator 15 is a communication interface for connecting the electronic board 1 to a network via wired or wireless connection to execute data communication with external equipment such as the touch pen 2 according to a predetermined communication protocol via the network.

The storage 12 is a non-volatile storage such as a hard disk drive (HDD) or a solid state drive (SSD) that stores various types of information. The storage 12 stores various control programs. The control programs are non-temporarily recorded in a computer-readable recording medium such as a universal serial bus (USB), a compact disc (CD), or a digital versatile disc (DVD) (any of these media is a registered trademark), and are read by a reading device (not illustrated) electrically connected to the electronic board 1, such as a USB drive, a CD drive, or a DVD drive, and are stored in the storage 12. The control programs may be downloaded from the external equipment via the network, and may be stored in the storage 12.

The controller 11 has control equipment such as a central processing unit (CPU), a read only memory (ROM), and a random access memory (RAM). The CPU is a processor that executes various types of arithmetic processing. The ROM is a non-volatile storage that stores control programs for causing the CPU to execute various types of arithmetic processing, such as a basic input output system (BIOS) and an operating system (OS), in advance. The RAM is a volatile or non-volatile storage that stores various types of information, and is used as a temporal storage memory (a working area) for various types of processing to be executed by the CPU. Moreover, the controller 11 causes the CPU to execute various types of control programs stored in advance in the ROM or the storage 12, thereby controlling the electronic board 1.

Figure 2:
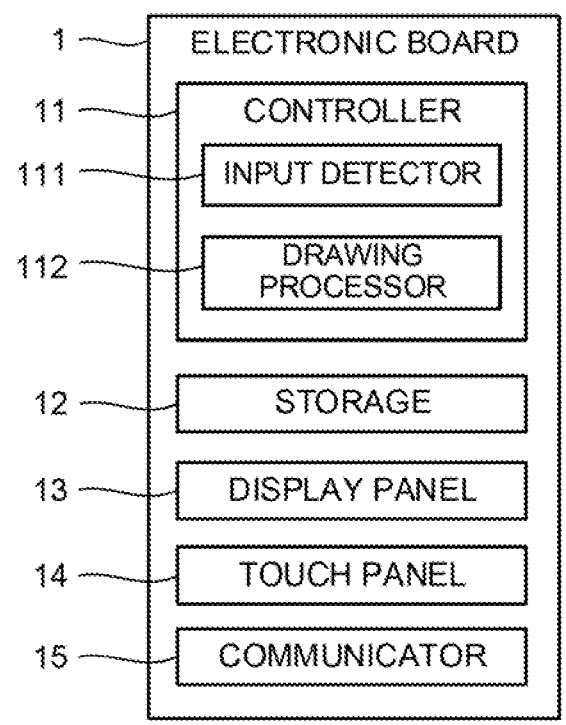
FIG. 2 is a block diagram illustrating a configuration of an electronic board according to the embodiment of the present disclosure.

Specifically, the controller 11 includes, as illustrated in FIG. 2, various processors such as an input detector 111 and a drawing processor 112. Note that the CPU executes various types of processing according to the control programs, and therefore, the controller 11 functions as various processors. Moreover, some or all processors included in the controller 11 may include electronic circuits. Note that the control programs may be programs for causing multiple processors to function as various processors.

The input detector 111 detects the touch input on the touch panel 14. Specifically, the input detector 111 detects positional coordinates input (specified) by the touch pen 2 on a contact target (e.g., the input surface of the touch panel 14). For example, the input detector 111 detects a change in capacitance between the touch pen 2 and the input surface, thereby detecting the positional coordinates. The method for detecting the positional coordinates is not limited to a capacitive method, and well-known various methods can be applied.

The drawing processor 112 draws, on the display panel 13, information corresponding to the touch input detected by the input detector 111. For example, the drawing processor 112 draws, based on position information on the touch input detected by the input detector 111, the handwriting character corresponding to the touch input at a predetermined position on the display panel 13.

Touch Pen 2

The touch pen 2 is an electronic pen (also called a stylus pen) for performing the touch input on the electronic board 1 by a user. For example, the user makes, with the touch pen 2, the touch input to the input surface (the contact target) of the touch panel 14.

Figure 3:
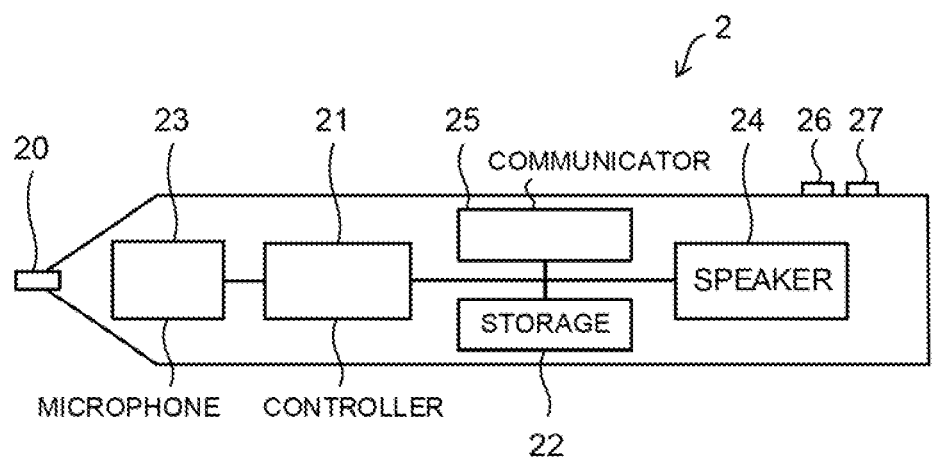
FIG. 3 is a block diagram illustrating a configuration of a touch pen according to the embodiment of the present disclosure.
Figure 4:
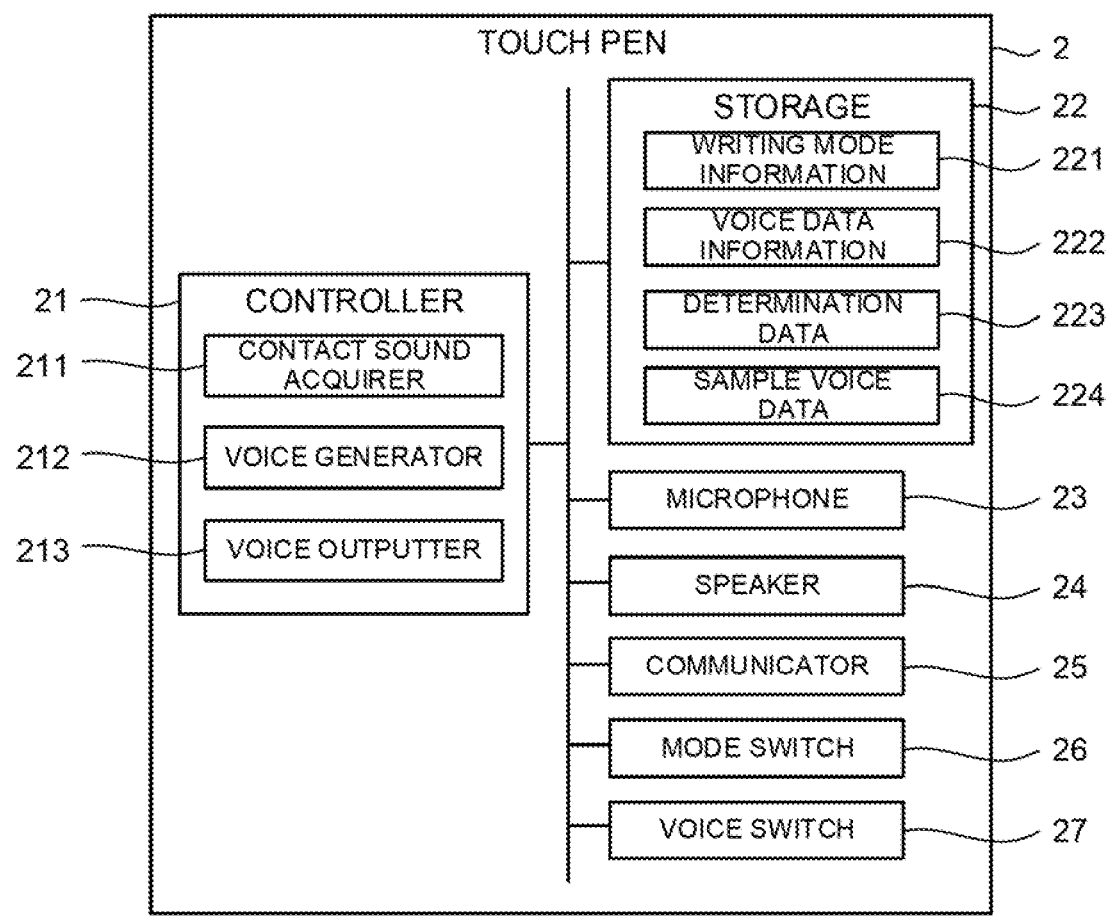
FIG. 4 is a block diagram illustrating a specific configuration of the touch pen according to the embodiment of the present disclosure.

FIG. 3 is a schematic block diagram of an outline configuration of the touch pen 2, and FIG. 4 is a block diagram of a specific configuration of the touch pen 2. The touch pen 2 includes a controller 21, a storage 22, a microphone 23, a speaker 24, a communicator 25, a mode switch 26, and a voice switch 27. The microphone 23 is provided in the vicinity of the nib 20 as one end of the touch pen 2, and the speaker 24 is provided at the other end of the touch pen 2.

The microphone 23 detects contact sound generated when the nib 20 of the touch pen 2 contacts the contact target such as the input surface of the touch panel 14. Note that "sound" described in the present application means vibration propagating in a medium, and in addition to a narrow sense of "sound" as air vibration propagating in air, includes object vibration propagating in the touch pen 2. The contact target is not limited to the input surface of the touch panel 14, and may be a desk etc. The input surface of the touch panel 14 and the desk are examples of the contact target of the present disclosure. Moreover, the nib 20 is one example of a tip end of the writing input device of the present disclosure. The microphone 23 outputs a detection signal to the controller 21 when detecting the contact sound.

The speaker 24 outputs predetermined voice according to a command of the controller 21. The speaker 24 is one example of a speaker of the present disclosure. For example, the speaker 24 informs the outside of, e.g., pseudo voice of hit sound (first touch sound) generated by contact of the nib 20 with the input surface of the touch panel 14 at the start of writing or pseudo voice of friction sound generated by friction (movement) of the nib 20 against the input surface during writing. The first touch sound is sound when the nib 20 taps on the input surface. The friction sound is sound generated when the nib 20 moves in contact with the input surface after the start of contact between the nib 20 and the input surface.

Note that the speaker 24 may be provided outside the touch pen 2. For example, the speaker 24 may be provided at the electronic board 1, or may be provided at equipment outside the touch pen 2 and the electronic board 1. For example, the speaker 24 may be a speaker placed in a meeting room where the writing input system 100 is introduced.

The communicator 25 is a communication interface for connecting the touch pen 2 to a network via wired or wireless connection to execute data communication with external equipment such as the electronic board 1 according to a predetermined communication protocol via the network.

The mode switch 26 is a switch for switching a writing mode according to the type (e.g., the quality and tone of sound) of pseudo voice. The writing mode includes, for example, a blackboard writing mode M1 corresponding to sound generated when writing is performed with a chalk on a blackboard, a pencil writing mode M2 corresponding to sound generated when writing is performed with a pencil on paper, and a ballpoint pen writing mode M3 corresponding to sound generated when writing is performed with a ballpoint pen on paper. Every time the user presses the mode switch 26, the writing mode is switched to the blackboard writing mode M1, the pencil writing mode M2, and the ballpoint pen writing mode M3 in this order.

The voice switch 27 is a switch for switching a mode between a voice mode for outputting the pseudo voice and a non-voice mode for not outputting the pseudo voice. When the voice switch 27 is brought into an ON state, the mode is switched to the voice mode. When the voice switch 27 is brought into an OFF state, the mode is switched to the non-voice mode. In a case where the user wishes to output the pseudo voice, the user brings the voice switch 27 into the ON state to set the mode to the voice mode.

The storage 22 is a non-volatile storage including, e.g., a semiconductor memory, a hard disk drive (HDD), or a solid state drive (SSD) that stores various types of information. For example, the storage 22 stores control programs such as a voice output program for causing the controller 21 to execute later-described voice output processing (see FIG. 9). For example, the voice output program is non-temporarily recorded in a computer-readable recording medium such as a USB, a CD, or a DVD (any of these media is a registered trademark), and is read by a reading device (not illustrated) electrically connected to the touch pen 2, such as a USB drive, a CD drive, or a DVD drive, and is stored in the storage 22. The voice output program may be downloaded from the external equipment via the network, and may be stored in the storage 22.

Moreover, the storage 22 includes writing mode information 221, voice data information 222, determination data 223, and sample voice data 224.

Figure 5:
FIG. 5 is a view illustrating an example of writing mode information stored in a storage of the touch pen according to the embodiment of the present disclosure.

FIG. 5 is a table of one example of the writing mode information 221. Information such as the writing modes M1, M2, M3 is recorded in the writing mode information 221. Information on one or more writing modes is registered in advance in the writing mode information 221. Note that the touch pen 2 may be configured so that the user of the touch pen 2 can add or delete the writing mode as necessary.

FIG. 6 is a table of one example of the voice data information 222. The information on the writing mode, information on the determination data, information on the sample voice data, and voice processing information (e.g., a later-described "sound volume coefficient") are registered in association with each other in the voice data information 222. The writing mode is the writing mode registered in the writing mode information 221 illustrated in FIG. 5.

The determination data is, as a first example, matching waveform data (voice waveform data) for specifying the type of contact sound detected by the microphone 23. The determination data is stored in the determination data 223 illustrated in FIG. 7. For example, voice waveform data of determination data DF11 for first touch sound with a loud sound volume, voice waveform data of determination data DF12 for first touch sound with a soft sound volume, voice waveform data of determination data DR11 for friction sound with a loud sound volume, and voice waveform data of determination data DR12 for friction sound with a soft sound volume are registered in the determination data 223. Identification information on the determination data (the voice waveform data) registered in the determination data 223 illustrated in FIG. 7 is registered in the voice data information 222 (see FIG. 6). In such a determination method, voice waveform shape characteristics such as distortion can be used for determination, and therefore, such a method is suitable for the case of generating different types of pseudo voice according to the waveform shape characteristics.

The determination data is, as a second example, a determination condition for specifying the type of contact sound detected by the microphone 23 according to a voice characteristic amount. The determination condition described herein is, for example, a voice characteristic amount threshold and information for performing determination by means of the threshold. For example, in the case of using a sound volume as the voice characteristic amount, the determination data includes information on a sound volume threshold for performing determination and information on the determination condition according to the threshold. Note that in such a determination method, the voice waveform shape characteristics cannot be used for determination, but a data amount and arithmetic processing necessary for determination can be reduced as compared to the above-described determination method by waveform matching of the voice waveform data.

Moreover, the voice processing information is, as characteristics common to the first and second examples, associated with the determination data in the voice data information 222. The voice processing information is set in advance according to the sound volume of the determination data. For example, a great value of the voice processing information is associated with the determination data DF11 for the first touch sound with the loud sound volume, and a small value of the voice processing information is associated with the determination data DF12 for the first touch sound with the soft sound volume.

The sample voice data is waveform data (voice waveform data) as a reference for generating the pseudo voice. The sample voice data is stored in the sample voice data 224 illustrated in FIG. 8. For example, voice waveform data of sample voice data (hereinafter referred to as "first sample voice data SF1") for the first touch sound and voice waveform data of sample voice data (hereinafter referred to as "second sample voice data SR1") for the friction sound are registered in the sample voice data 224. Identification information on the sample voice data (the voice waveform data) registered in the sample voice data 224 illustrated in FIG. 8 is registered in the voice data information 222 (see FIG. 6).

At least any one of the writing mode information 221, the voice data information 222, the determination data 223, and the sample voice data 224 of the storage 22 may be stored in a data server (not illustrated) placed outside the touch pen 2. The data server may include a single physical server, or may include a cloud server built from multiple physical servers.

The controller 21 has control equipment such as a CPU, a ROM, and a RAM. The CPU is a processor that executes various types of arithmetic processing. The ROM is a non-volatile storage that stores control programs for causing the CPU to execute various types of arithmetic processing, such as a BIOS and an OS, in advance. The RAM is a volatile or non-volatile storage that stores various types of information, and is used as a temporal storage memory (a working area) for various types of processing to be executed by the CPU. Moreover, the controller 21 causes the CPU to execute various types of control programs stored in advance in the ROM or the storage 22, thereby controlling the touch pen 2.

Specifically, the controller 21 includes, as illustrated in FIG. 4, various processors such as a contact sound acquirer 211, a voice generator 212, and a voice outputter 213. Note that the CPU executes various types of processing according to the voice output program, and therefore, the controller 21 functions as various processors. Moreover, some or all processors included in the controller 21 may include electronic circuits. Note that the voice output program may be a program for causing multiple processors to function as various processors.

The contact sound acquirer 211 acquires (detects), from the microphone 23, the contact sound generated when the nib 20 of the touch pen 2 contacts the contact target. Specifically, the contact sound acquirer 211 acquires the contact sound based on the detection signal acquired from the microphone 23 in a case where the nib 20 contacts the input surface of the touch panel 14. For example, the contact sound acquirer 211 acquires contact sound (hereinafter referred to as "first contact sound") when the nib 20 contacts the input surface of the touch panel 14 at the start of writing (at the start of contact: a first touch) and contact sound (hereinafter referred to as "second contact sound") when the nib 20 is rubbed against the input surface during writing (after the start of contact).

The voice generator 212 generates the pseudo voice based on the contact sound detected by the microphone 23. The voice generator 212 generates pseudo voice (hereinafter referred to as "first pseudo voice") of the first touch sound based on the first contact sound, and generates pseudo voice (hereinafter referred to as "second pseudo voice") of the friction sound based on the second contact sound. The voice generator 212 is one example of a voice generator of the present disclosure.

Moreover, the voice generator 212 generates the pseudo voice based on the contact sound detected by the microphone 23 and the sample voice data. For example, the voice generator 212 performs voice processing according to the characteristics of the contact sound for the sample voice data, thereby generating the pseudo voice. For example, the voice generator 212 performs voice processing according to the characteristics of the first contact sound for the first sample voice data SF1 stored in the sample voice data 224 (see FIG. 8), thereby generating the first pseudo voice. Moreover, the voice generator 212 performs voice processing according to the characteristics of the second contact sound for the second sample voice data SR1 stored in the sample voice data 224, thereby generating the second pseudo voice. The characteristics of the contact sound include, for example, the characteristics of the waveform of the contact sound and the characteristics of the sound volume.

Specifically, the voice generator 212 first waveform-matches a detection value (waveform data) of the microphone 23 with the voice waveform data (see FIG. 7) registered in the determination data 223, or first determines the voice characteristic amount according to the determination condition. Note that the determination data stores the voice waveform data (see FIG. 7) or the determination condition, the corresponding reference voice waveform data (see FIG. 8) on the sample voice data, and the voice processing information in association with each other (see FIGS. 6, 7, and 8). The voice generator 212 determines, by determination described above, the sample voice data and the voice processing information.

Next, the voice generator 212 performs the voice processing according to the voice processing information for the determined sample voice data, thereby generating the pseudo voice (the first pseudo voice, the second pseudo voice). The voice processing information is information for performing various types of voice processing, and specifically includes the sound volume coefficient as a coefficient defining a sound volume magnification, a frequency change coefficient as a coefficient defining a voice frequency change magnification, and various voice processing filters (e.g., a voice waveform change filter and a bandpass filter) for performing other types of voice processing. The voice processing includes, for example, the processing (the sound volume adjustment processing) of amplifying the sample voice data based on the sound volume coefficient, the processing (the frequency change processing) of changing the voice frequency of the sample voice data based on the frequency modulation coefficient, the processing (the voice waveform change processing of changing the voice waveform of the sample voice data close to a specific waveform such as a square wave or a sine wave by means of the voice waveform change filter, and the processing (the bandpass filter processing) of emphasizing voice with a specific frequency in the sample voice data by, e.g., a low-pass filter or a high-pass filter as the bandpass filter. The voice generator 212 performs, as one example described herein, the sound volume adjustment processing according to the sound volume coefficient for the sample voice data, thereby generating the pseudo voice.

A voice generation method by the voice generator 212 is not limited to those described above. In other methods, the voice generator 212 may perform, for example, the voice processing for the contact sound acquired by the contact sound acquirer 211, thereby generating the pseudo voice. Specifically, the voice generator 212 performs, without utilizing the sample voice data, the voice processing for the contact sound detected by the microphone, thereby generating the pseudo voice. For example, the voice generator 212 amplifies the contact sound detected by the microphone based on the sound volume coefficient, thereby generating the pseudo voice.

Moreover, as other voice generation methods in the case of utilizing the sample voice data, the voice generator 212 may directly use the sample voice data as the pseudo voice without performing the voice processing for the sample voice data, for example.

The voice outputter 213 outputs, from the speaker 24, the pseudo voice (the first pseudo voice, the second pseudo voice) generated by the voice generator 212. The voice outputter 213 is one example of a voice outputter of the present disclosure.

Voice Output Processing

Figure 9:
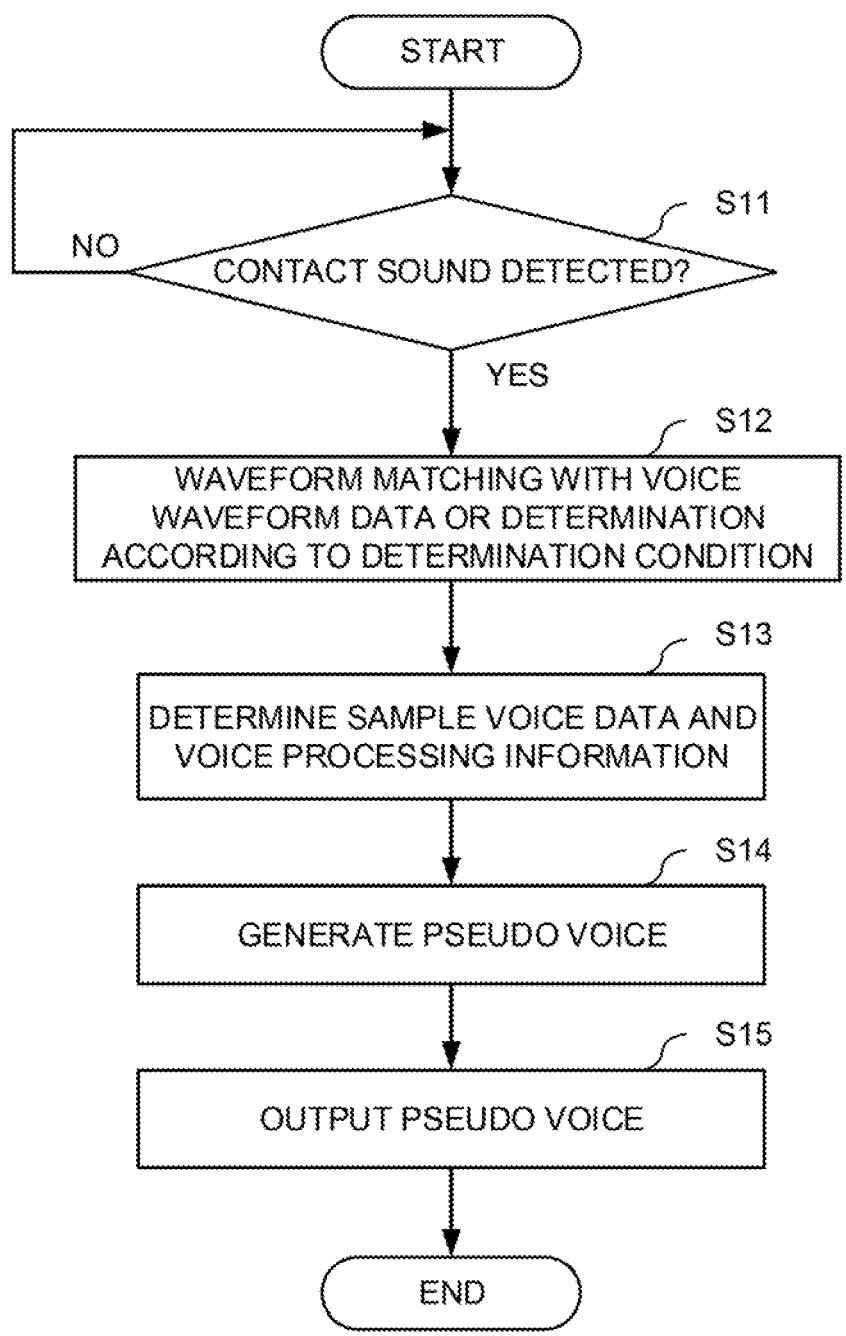
FIG. 9 is a flowchart illustrating an example of the procedure of voice output processing executed in the writing input system according to the embodiment of the present disclosure.

One example of voice output processing executed by the writing input system 100 will be described with reference to FIG. 9. For example, the voice output processing is executed by the controller 21 of the touch pen 2. Note that the writing mode is set herein to the blackboard writing mode M1.

Note that the present disclosure can be taken as an invention of a voice output method for executing one or more steps included in the voice output processing, and one or more steps included in the voice output processing described herein may be omitted as necessary. Note that for each step in the voice output processing, an execution order may vary within a scope in which similar features and advantageous effects are provided. Further, the case of executing each step in the voice output processing by the controller 21 will be described herein by way of example, but a voice output method in which each step in the voice output processing is dispersively executed by multiple processors is also conceivable as other embodiments.

First, at a step S11, the controller 21 determines whether or not the contact sound generated by contact of the nib 20 of the touch pen 2 with the contact target (the input surface of the touch panel 14) has been detected (acquired). When the controller 21 detects the contact sound (S11: YES), the processing transitions to a step S12.

At the step S12, the controller 21 waveform-matches the waveform data of the detected contact sound with the voice waveform data (see FIG. 7) registered in the determination data 223, or determines the voice characteristic amount according to the determination condition.

Next, at a step S13, the controller 21 determines, as a result of waveform matching or determination on the voice characteristic amount according to the determination condition, the sample voice data and the voice processing information associated with the matched determination data (see FIG. 6).

Next, at a step S14, the controller 21 performs the voice processing according to the voice processing information for the determined sample voice data, thereby generating the pseudo voice.

Finally, at a step S15, the controller 21 outputs, from the speaker 24, the generated pseudo voice (the first pseudo voice, the second pseudo voice). In the above-described manner, the voice output processing is executed.

As described above, the writing input system 100 according to the present embodiment includes such a configuration that the pseudo voice is generated based on the contact sound detected by contact of the nib 20 of the touch pen 2 with the contact target (e.g., the input surface of the touch panel 14) and the generated pseudo voice is output. Thus, pseudo voice of writing sound can be output according to various conditions such as the speed, inclination, and writing pressure of the touch pen 2, a state at the start of writing, and a state during writing. Consequently, pseudo voice with high writing sound reproducibility can be output. Moreover, the sound (the first touch sound) generated by the first touch and the sound (the friction sound) during writing subsequent to the first touch can be properly reproduced.

The present disclosure is not limited to the above-described embodiment. Variations corresponding to other embodiments of the present disclosure will be described below.

First Variation

In the above-described embodiment (the first embodiment), the embodiment in which the voice generator 212 performs the voice processing according to the characteristics of the contact sound for the sample voice data to generate the pseudo voice has been described. On the other hand, in a first variation, the voice generator 212 performs the voice processing for the contact sound detected by the microphone 23, thereby generating the pseudo voice.

A difference between the first variation and the first embodiment is that the voice processing is performed for the sample voice data to generate the pseudo voice in the first embodiment and the voice processing is performed for the contact sound itself to generate the pseudo voice in the first variation. Note that other characteristics such as a voice processing method are common to those of the first embodiment.

In the first variation, the voice processing is performed for the voice waveform of the contact sound such that such a voice waveform becomes close to the voice waveform of the writing sound to be output, and thereafter, such sound is output as the pseudo voice. Thus, the first variation is effective in a case where the voice waveform of the contact sound is similar to the voice waveform of the writing sound to be output to such an extent that the voice waveform of the contact sound can be imitated by the voice processing. On the other hand, in a case where the voice waveform of the contact sound and the voice waveform of the writing sound to be output are totally different from each other, it is effective that voice similar to the voice waveform of the writing sound to be output in the first embodiment is used as the sample voice data and the pseudo voice is generated by the voice processing of the sample voice data.

Second Variation

In the above-described embodiment, in a case where the user brings the voice switch 27 into the ON state, the pseudo voice might be output in some cases even when the user does not perform writing with the touch pen 2 on the input surface of the touch panel 14. For example, in a case where the user does not perform writing with the touch pen 2 on the input surface of the touch panel 14, when the microphone 23 of the touch pen 2 detects sound similar to the first touch sound or the friction sound, the pseudo voice corresponding to the detected sound is output. It cannot be said that the pseudo voice in this case is one intended by the user.

Figure 10:
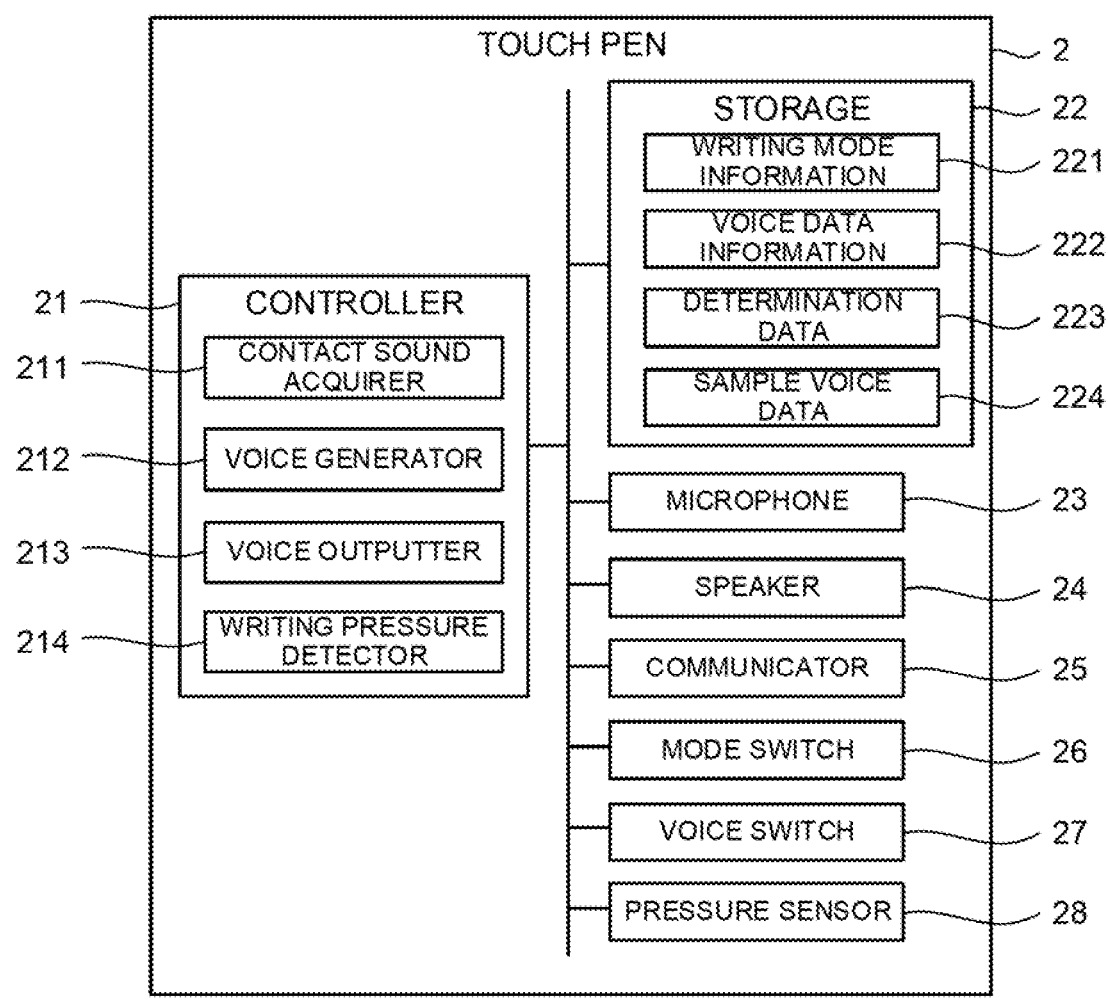
FIG. 10 is a block diagram illustrating another configuration of the touch pen according to the embodiment of the present disclosure.

For this reason, the writing input system 100 according to a second variation includes such a configuration that the pseudo voice is output under a condition where the user performs writing with the touch pen 2 on the input surface of the touch panel 14. FIG. 10 is a block diagram of a configuration of the touch pen 2 according to the second variation. As illustrated in FIG. 10, the touch pen 2 according to the second variation is configured such that the touch pen 2 (see FIG. 4) according to the above-described embodiment further includes a pressure sensor 28 and a writing pressure detector 214.

The pressure sensor 28 senses a writing pressure applied to the nib 20 in a case where the nib 20 of the touch pen 2 contacts the contact target such as the input surface of the touch panel 14. For example, a well-known pressure sensor using a piezoelectric element can be applied as the pressure sensor 28. The pressure sensor 28 outputs a sensing signal to the controller 21 when sensing the writing pressure.

The writing pressure detector 214 detects the writing pressure provided by contact of the nib 20 of the touch pen 2 with the contact target. The writing pressure detector 214 is one example of a writing pressure detector of the present disclosure. Specifically, the writing pressure detector 214 detects the writing pressure based on the sensing signal acquired from the pressure sensor 28 in a case where the nib 20 has contacted the input surface of the touch panel 14.

The voice outputter 213 outputs the pseudo voice in a case where the writing pressure detected by the writing pressure detector 214 is equal to or greater than a threshold (corresponding to a first threshold of the present disclosure), and does not output the pseudo voice in a case where the writing pressure is less than the threshold. Thus, a configuration can be realized, in which the pseudo voice is output in a case where the user performs the touch input with the touch pen 2 on the input surface of the touch panel 14 and is not output in a case where the user does not perform the touch input with the touch pen 2 on the input surface of the touch panel 14.

The writing input system 100 according to the second variation may have the following configuration.

For example, the detection signal is notified to the touch pen 2 in a case where the controller 11 (the input detector 111) of the electronic board 1 has detected the positional coordinates input (specified) by the touch pen 2. The controller 21 (corresponding to a detection acquirer of the present disclosure) of the touch pen 2 acquires the detection signal corresponding to the touch input from the electronic board 1. The controller 21 (the voice outputter 213) outputs the pseudo voice in the case of acquiring the detection signal from the electronic board 1, and does not output the pseudo voice in the case of not acquiring the detection signal from the electronic board 1.

In other configurations, the touch pen 2 includes an acceleration sensor (not illustrated), and based on a detection result of the acceleration sensor, it is determined whether the touch pen 2 is in a use state (a moving state) or a non-use state (a stationary state). Moreover, the controller 21 (the voice outputter 213) outputs the pseudo voice in a case where the touch pen 2 is in the use state, and does not output the pseudo voice in a case where the touch pen 2 is in the non-use state. According to each configuration of the second variation, the output of the pseudo voice not intended by the user can be prevented.

Third Variation

The writing input system 100 may generate the pseudo voice by different methods according to the type of contact sound. Specifically, the voice generator 212 generates the pseudo voice (the first pseudo voice) of the first touch sound based on the writing pressure in a case where an amount of change in the writing pressure detected by the writing pressure detector 214 (see FIG. 10) is equal to or greater than a threshold (corresponding to a second threshold of the present disclosure), and generates the pseudo voice (the second pseudo voice) of the friction sound based on the contact sound detected by the microphone 23 in a case where the amount of change in the writing pressure detected by the writing pressure detector 214 is less than the threshold. As described above, the voice generator 212 may change the pseudo voice according to the writing pressure detected by the writing pressure detector 214.

Normally, the hit sound (the first touch sound) generated by contact of the nib 20 of the touch pen 2 with the input surface at the start of writing shows a great amount of change in the writing pressure, and the friction sound generated by friction of the nib 20 against the input surface during writing shows a small amount of change in the writing pressure. Thus, in a case where the amount of change in the writing pressure detected by the writing pressure detector 214 is equal to or greater than the threshold, the voice generator 212 generates the pseudo voice of the first touch sound based on the amount of change in the writing pressure. In this case, the storage 22 may store, in determination data 225 (see FIG. 11), writing pressure waveform data for waveform matching with an output value (waveform data) of the pressure sensor 28. In a case where the amount of change in the writing pressure detected by the writing pressure detector 214 is equal to or greater than the threshold, the voice generator 212 performs the waveform matching by means of the output value or derivative value of the pressure sensor 28, thereby determining the sample voice data and the voice processing information. On the other hand, in a case where the amount of change in the writing pressure detected by the writing pressure detector 214 is less than the threshold, the voice generator 212 performs the waveform matching by means of the contact sound detected by the microphone 23, thereby determining the sample voice data and the voice processing information.

The voice outputter 213 outputs, from the speaker 24, the pseudo voice (the first pseudo voice, the second pseudo voice) generated by the voice generator 212. That is, the voice outputter 213 outputs, from the speaker 24, the pseudo voice of the first touch sound generated based on the writing pressure in a case where the amount of change in the writing pressure detected by the writing pressure detector 214 is equal to or greater than the threshold, and outputs, from the speaker 24, the pseudo voice of the friction sound generated based on the contact sound detected by the microphone 23 in a case where the amount of change in the writing pressure detected by the writing pressure detector 214 is less than the threshold.

As described above, the voice generator 212 generates the pseudo voice based on the writing pressure detected by the writing pressure detector 214 and the contact sound detected by the microphone 23. According to the above-described configuration, the touch input of the first touch can be sensitively detected, and therefore, the first touch can be detected with favorable accuracy. That is, as compared to a case where the pseudo voice is generated using only the voice waveform data of the microphone 23, the first touch sound and the friction sound can be determined using the pressure sensor 28 with favorable accuracy, and thereafter, the pseudo voice corresponding to each type of sound can be output. Moreover, the waveform matching according to the writing pressure waveform data of the writing pressure detected by the pressure sensor 28 can be performed within a shorter period of time as compared to the waveform matching according to the voice waveform data detected by the microphone 23. Thus, pseudo voice corresponding to sound generated at the moment of the first touch can be output without delay. As described above, it is effective to generate and output the pseudo voice by means of the voice waveform data detected by the microphone 23 and the writing pressure waveform data detected by the pressure sensor 28.

Fourth Variation

Normally, in a case where the contact sound generated by contact of the touch pen 2 with the input surface is loud, the contact sound can be directly caught. In addition, in a case where the pseudo voice is output in this state, the contact sound and the pseudo voice are doubly caught, leading to a user's feeling of discomfort. For this reason, the necessity of outputting the pseudo voice is low. On the other hand, in a case where the contact sound generated by contact of the touch pen 2 with the input surface is soft, it is difficult to directly catch the contact sound, and for this reason, the necessity of outputting the pseudo voice is high. Thus, the writing input system 100 according to a fourth variation is preferably configured such that the voice outputter 213 outputs the pseudo voice in a case where the sound volume of the contact sound detected by the microphone 23 is equal to or less than a threshold and does not output the pseudo voice in a case where the sound volume of the contact sound detected by the microphone 23 exceeds the threshold. With this configuration, the pseudo voice can be output with no feeling of discomfort according to the sound volume of the contact sound.

In the writing input system 100 according to each of the above-described embodiments, each processor (the contact sound acquirer 211, the voice generator 212, and the voice outputter 213) of the controller 21 of the touch pen 2 and each type of information (the writing mode information 221, the voice data information 222, the determination data 223, and the sample voice data 224) stored in the storage 22 may be included in the electronic board 1. Moreover, the microphone 23 and the speaker 24 may be included in the electronic board 1. For example, the electronic board 1 may include the speakers 24 at two places on the left and right, and may be configured such that the pseudo voice is output from the speaker 24 closer to the position (the positional coordinates) at which the touch input is made by the touch pen 2.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

What is claimed is:

1. A writing input device capable of performing writing input on a touch panel, the writing input device comprising:
    a microphone that detects contact sound generated when a tip end of the writing input device contacts a contact target;
    voice generating circuitry that generate pseudo voice based on the contact sound detected by the microphone;
    voice output circuitry that output the pseudo voice generated by the voice generating circuitry, and
    writing pressure detecting circuitry that detect a writing pressure applied to the tip end of the writing input device, wherein
    the voice generating circuitry change the pseudo voice according to the writing pressure detected by the writing pressure detecting circuitry, and
    the voice generating circuitry generate the pseudo voice based on the writing pressure in a case where an amount of change in the writing pressure detected by the writing pressure detecting circuitry is equal to or greater than a second threshold, and generate the pseudo voice based on the contact sound detected by the microphone in a case where the amount of change in the writing pressure detected by the writing pressure detecting circuitry is less than the second threshold.

2. The writing input device according to claim 1, wherein the voice generating circuitry generate the pseudo voice by performing voice processing for the contact sound detected by the microphone.

3. The writing input device according to claim 1, further comprising: a storage that stores sample voice data, wherein
    the voice generating circuitry generate the pseudo voice based on the contact sound detected by the microphone and the sample voice data.

4. The writing input device according to claim 3, wherein the voice generating circuitry generate the pseudo voice by performing voice processing according to a characteristic of the contact sound for the sample voice data.

5. The writing input device according to claim 1, wherein the voice output circuitry output the pseudo voice in a case where the writing pressure detected by the writing pressure detecting circuitry is equal to or greater than a first threshold, and does not output the pseudo voice in a case where the writing pressure is less than the first threshold.

6. The writing input device according to claim 1, further comprising: detection acquiring circuitry that acquire a detection signal corresponding to the writing input from the touch panel in a case where the writing input device performs the writing input on the touch panel, wherein
    the voice output circuitry output the pseudo voice in a case where the detection signal is acquired by the detection acquiring circuitry, and do not output the pseudo voice in a case where the detection signal is not acquired by the detection acquiring circuitry.

7. The writing input device according to claim 1, wherein the voice output circuitry output the pseudo voice in a case where a volume of the contact sound detected by the microphone is equal to or less than a threshold, and do not output the pseudo voice in a case where the volume of the contact sound detected by the microphone exceeds the threshold.

8. The writing input device according to claim 1, further comprising: a speaker that outputs voice, wherein
    the voice output circuitry output, from the speaker, the pseudo voice generated by the voice generating circuitry.

9. A writing input system, comprising: a touch panel; and the writing input device according to claim 1.

10. A writing input device capable of performing writing input on a touch panel, the writing input device comprising:
    a microphone that detects contact sound generated when a tip end of the writing input device contacts a contact target;
    voice generating circuitry that generate pseudo voice based on the contact sound detected by the microphone;
    voice output circuitry that output the pseudo voice generated by the voice generating circuitry, and
    writing pressure detecting circuitry that detect a writing pressure applied to the tip end of the writing input device, wherein
    the voice generating circuitry change the pseudo voice according to the writing pressure detected by the writing pressure detecting circuitry, and
    the voice generating circuitry generate the pseudo voice based on the writing pressure detected by the writing pressure detecting circuitry and the contact sound detected by the microphone.

11. The writing input device according to claim 10, wherein the voice generating circuitry generate the pseudo voice by performing voice processing for the contact sound detected by the microphone.

12. The writing input device according to claim 10, further comprising: a storage that stores sample voice data, wherein
    the voice generating circuitry generate the pseudo voice based on the contact sound detected by the microphone and the sample voice data.

13. The writing input device according to claim 12, wherein the voice generating circuitry generate the pseudo voice by performing voice processing according to a characteristic of the contact sound for the sample voice data.

14. The writing input device according to claim 10, wherein the voice output circuitry output the pseudo voice in a case where the writing pressure detected by the writing pressure detecting circuitry is equal to or greater than a first threshold, and do not output the pseudo voice in a case where the writing pressure is less than the first threshold.

15. The writing input device according to claim 10, further comprising: detection acquiring circuitry that acquire a detection signal corresponding to the writing input from the touch panel in a case where the writing input device performs the writing input on the touch panel, wherein
    the voice output circuitry output the pseudo voice in a case where the detection signal is acquired by the detection acquiring circuitry, and do not output the pseudo voice in a case where the detection signal is not acquired by the detection acquiring circuitry.

16. The writing input device according to claim 10, wherein the voice output circuitry output the pseudo voice in a case where a volume of the contact sound detected by the microphone is equal to or less than a threshold, and do not output the pseudo voice in a case where the volume of the contact sound detected by the microphone exceeds the threshold.

17. The writing input device according to claim 10, further comprising: a speaker that outputs voice, wherein
the voice output circuitry output, from the speaker, the pseudo voice generated by the voice generating circuitry.

18. A writing input system, comprising: a touch panel; and the writing input device according to claim 10.

* * * * *